United States Patent [19]
Alanara

[11] Patent Number: 6,064,880
[45] Date of Patent: May 16, 2000

[54] MOBILE STATION HAVING SHORT CODE MEMORY SYSTEM-LEVEL BACKUP AND RESTORATION FUNCTION

[75] Inventor: Seppo Alanara, Oulu, Finland

[73] Assignee: Nokia Mobile Phones Limited, Salo, Finland

[21] Appl. No.: 08/882,591

[22] Filed: Jun. 25, 1997

[51] Int. Cl.[7] .................................................. H04M 3/00
[52] U.S. Cl. ........................ 455/419; 455/466; 455/426; 455/560
[58] Field of Search .................................... 455/412, 420, 455/419, 556, 557, 456, 457, 575, 414, 405

[56] References Cited

U.S. PATENT DOCUMENTS

| | | | |
|---|---|---|---|
| 5,321,737 | 6/1994 | Patsiokas | 455/414 |
| 5,524,135 | 6/1996 | Mizikovsky et al. | 455/419 |
| 5,577,103 | 11/1996 | Foti | 455/412 |
| 5,689,825 | 11/1997 | Averbuch et al. | 455/575 |
| 5,699,275 | 12/1997 | Beaslet et al. | 395/200.51 |
| 5,706,330 | 1/1998 | Bufferd et al. | 455/405 |
| 5,761,618 | 6/1998 | Lynch et al. | 455/419 |
| 5,771,455 | 6/1998 | Kennedy, III et al. | 455/456 |
| 5,790,952 | 8/1998 | Seazholtz et al. | 455/432 |
| 5,794,142 | 8/1998 | Vanttila et al. | 455/419 |
| 5,794,144 | 8/1998 | Comer et al. | 455/426 |
| 5,850,594 | 12/1998 | Cannon et al. | 455/31.3 |
| 5,854,978 | 12/1998 | Heidari | 455/418 |
| 5,915,225 | 6/1999 | Mills | 455/558 |
| 5,920,826 | 7/1999 | Metso et al. | 455/557 |
| 5,923,735 | 7/1999 | Swartz et al. | 455/557 |
| 5,926,756 | 8/1999 | Piosenka et al. | 455/418 |
| 5,940,767 | 8/1999 | Piosenka et al. | 455/466 |

OTHER PUBLICATIONS

IS–136.1 Revision A Published Version, Mar. 21, 1996, pp. 212, 231, 321.
IS–136.2 Rev A Post–Ballot Version, Feb. 12, 1996, pp. 242–243, 245.

(List continued on next page.)

Primary Examiner—Dwayne D. Bost
Assistant Examiner—Charles R Craver
Attorney, Agent, or Firm—Ohlandt, Greeley, Ruggerio & Perle

[57] ABSTRACT

A method is disclosed for operating a telecommunications system. The method includes a first step of providing at least one mobile station and a telecommunications network that are bidirectionally coupled together through a radio link. The mobile station includes a first memory, referred to as a Short Code Memory (SCM), for storing at least user-specified information. A first step of transmitting transmits at least some of the contents of the first memory from the mobile station to the telecommunications network, and a first step of receiving receives the transmitted contents of the first memory and stores at least some of the received contents in a second memory. A second step of transmitting transmits contents of the second memory from the telecommunications network to the mobile station, and a second step of receiving receives the transmitted contents of the second memory and stores at least some of the received contents in the first memory. In one embodiment of this invention the second memory is associated with an Over-the-Air Activation Function (OATF), while in a second embodiment the second memory is associated with a Short Message Service (SMS) Cellular Messaging Teleservice (CMT) Message Center (MC). In this manner the SCM contents are archived at the network level, and can be subsequently downloaded to the same or a different mobile station to restore the contents of the SCM.

26 Claims, 2 Drawing Sheets

OTHER PUBLICATIONS

"On–Air–Activation Version 6.2", TR45.3.6/95.04.25.07, TDMA Cellular Ssytems Working Group, Apr. 25, 1995, 10 pages.

"Stage 2 Description for Over–the–Air Activation", TR45.5_/94.9.13.05, Sep. 12, 1994, 23 pgs.

"Stage 3 Description for Over–the–Air Activation", TR45.5_/94.9.13.06, Sep. 12, 1994, 18 pages.

"Stage 1 Description of Over–the–Air Activation Feature", TR45.5.1/94.07.21._ 11 pages.

Unstructured Supplementary Service Data (USSD), GSM 02.90.

Man–Machine Interface (MMI) of the Mobile Station (MS), GSM 02.30.

"European digital cellular telecommunications system (Phase 2); General on supplementary services", GSM 02.04.

"Alphabets and language–specific information", GSM 03.38.

Technical realization of the Short Message Service (SMS) Point–to–Point (PP), GSM 03.40.

IS–136.1 Revision A, Published Version, Mar. 21, 1996, Sec. 7.2, 45 pages.

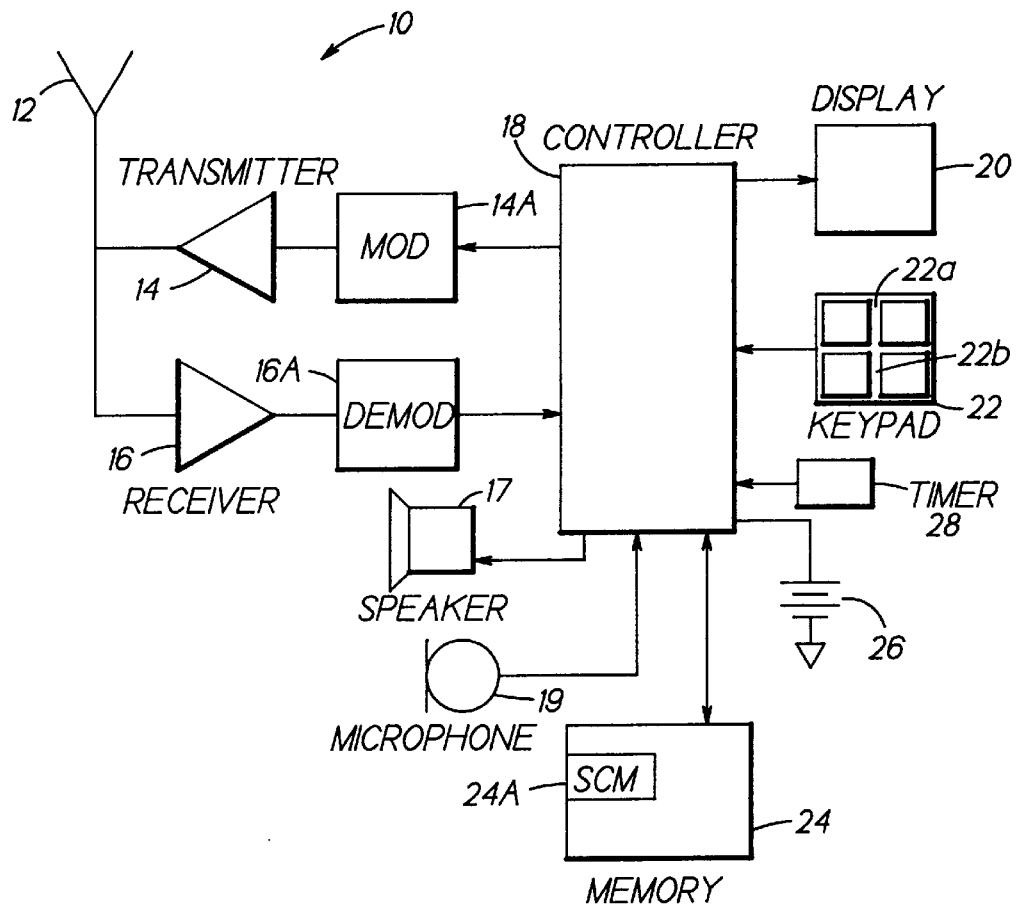
FIG. 1
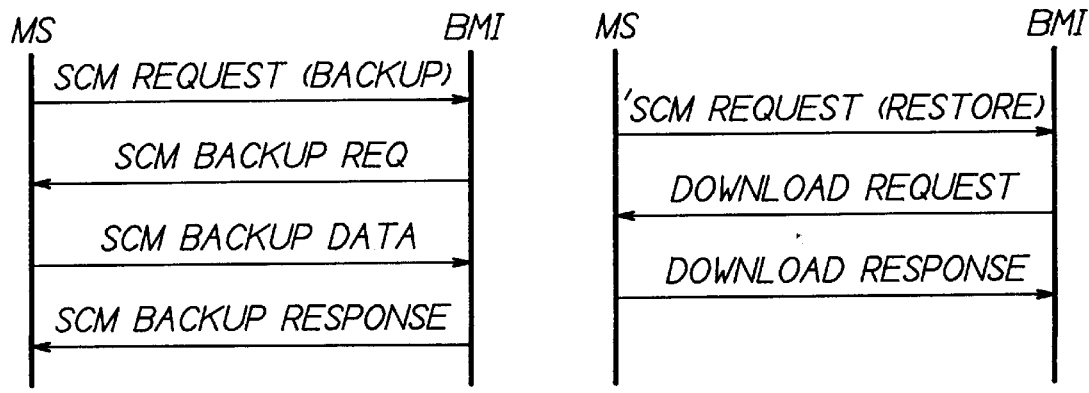
FIG. 3A
FIG. 3B

MOBILE STATION HAVING SHORT CODE MEMORY SYSTEM-LEVEL BACKUP AND RESTORATION FUNCTION

FIELD OF THE INVENTION

This invention relates generally to radiotelephones and, in particular, to radiotelephones or mobile stations such as those capable of operation with a cellular network.

BACKGROUND OF THE INVENTION

Modern wireless communications systems, such as cellular telephone systems, typically include a digital transmission and reception capability that enables messages and data to be transferred between the network and individual mobile stations such as handheld radiotelephone transceivers, portable computers, and personal digital assistants (PDAs). Two currently available cellular telephone communications that support this capability are TDMA-based systems known as IS-136 and as GSM. Other systems, such as the CDMA-based system known as IS-95, also support this capability.

By example, IS-136, Revision A, describes in Section 7 different classes of Point-to-Point Teleservices that build on a R-Data message (Sections 2.7.3.1.3.2.19 and 3.7.3.1.3.2.23 of IS-136.2, and Sections 6.4.3.11 and 6.4.4.9 of IS-136.1) An Over-the-Air Activation Teleservice (OATS) that supports data exchange between a mobile station and a Customer Service Center (CSC)/Over-the-Air Activation Function (OTAF) is described in Section 7.2. The data is organized in a specific format referred to as OATS messages (Section 7.2.7). The OATS Teleservice can be performed either on a Digital Traffic Channel (DTC) or a Digital Control Channel (DCCH). As presently specified, the OTAF includes procedures that allow a cellular service subscriber to activate (i.e., become authorized for) cellular service without the intervention of a third party, such as a dealer.

Currently available mobile stations also include a so-called Short Code Memory (SCM) for storing, typically, a list of alphanumeric text and related phone numbers. This data is typically stored in a non-volatile memory within the mobile station such that the data is always available for use.

However, currently available mobile stations that are known to the inventor do not provide a capability to backup or archive the data stored in the SCM. As such, if for some reason the SCM data is lost or corrupted, it is necessary for the user to re-enter all or some of the data stored in the SCM. Furthermore, if the user desires to obtain a new mobile station, there is at present no suitable capability to transfer the contents of the SCM to the new mobile station. In this regard, it can be realized that the SCM data may not be completely compatible with the functionality of the new mobile station. By example, the user's original mobile station may provide for alphanumeric strings of up to n characters to be stored in the SCM, while the new mobile station may provide a capability to store m characters, where m<n. The SCM data may also be stored in different formats, and certain SCM-related features supported by the original mobile station may not be supported by the new mobile station, and vice versa. As such, performing a simple byte-by-byte image transfer of the contents of one SCM to another SCM may not be desirable or feasible.

OBJECTS OF THE INVENTION

It is thus a first object of this invention to provide a method for transferring SCM data from a mobile station, for archiving the transferred SCM data at a location external to the mobile station, and for subsequently downloading the archived SCM data into the same or a different mobile station.

It is a further object of this invention to provide a signalling and message passing method, and a cellular network and mobile station that implement the method, for uploading SCM data from the mobile station to the cellular network, for storing the SCM data in a database of SCM data maintained by the network, and for subsequently downloading the stored SCM data to the same or a different mobile station.

It is another object of this invention to define a universal messaging paradigm for transferring SCM data between a mobile station and a network, that is independent of the specifics of the data format, capacity, and capabilities of the mobile station's SCM.

SUMMARY OF THE INVENTION

The foregoing and other problems are overcome and the objects of the invention are realized by methods and apparatus in accordance with embodiments of this invention.

This invention teaches a method for operating a telecommunications system, and includes a first step of providing at least one mobile station and a telecommunications network that are bidirectionally coupled together through a radio link. The mobile station includes a first memory, a SCM, for storing at least user-specified information. A first step of transmitting transmits at least some of the contents of the first memory from the mobile station to the telecommunications network, and a first step of receiving receives the transmitted contents of the first memory and stores at least some of the received contents in a second memory. A second step of transmitting transmits contents of the second memory from the telecommunications network to the mobile station, and a second step of receiving receives the transmitted contents of the second memory and stores at least some of the received contents in the first memory.

In one embodiment of this invention the second memory is associated with an Over-the-Air Activation Function (OATF), while in a second embodiment the second memory is associated with a Short Message Service (SMS) Cellular Messaging Teleservice (CMT) Message Center (MC).

The first step of transmitting may occur in response to an input from a use of the mobile station, and/or in response to an expiration of a timer that is maintained by the mobile station, and/or in response to an expiration of a timer that is maintained by the telecommunications network.

In a further embodiment of this invention the first step of transmitting transmits only those contents of the first memory that have changed or that have been newly added since a last execution of a SCM backup operation.

Also, in a further embodiment of this invention the second step of receiving receives an alphanumeric string having a length of n characters, and the step of storing includes an initial step of truncating the n characters before storage in the first memory.

It is within the scope of this invention that the first step of transmitting is executed by a first mobile station for backing up the SCM, and the second step of receiving is executed by a second mobile station for restoring the archived SCM contents to another SCM.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is a block diagram of a mobile station that is constructed and operated in accordance with this invention;

FIG. 3A illustrates the message flow for a SCM backup procedure in accordance with this invention; and FIG. 3B illustrates the message flow for a SCM download procedure in accordance with this invention.

DETAILED DESCRIPTION OF THE INVENTION

Figure 2:
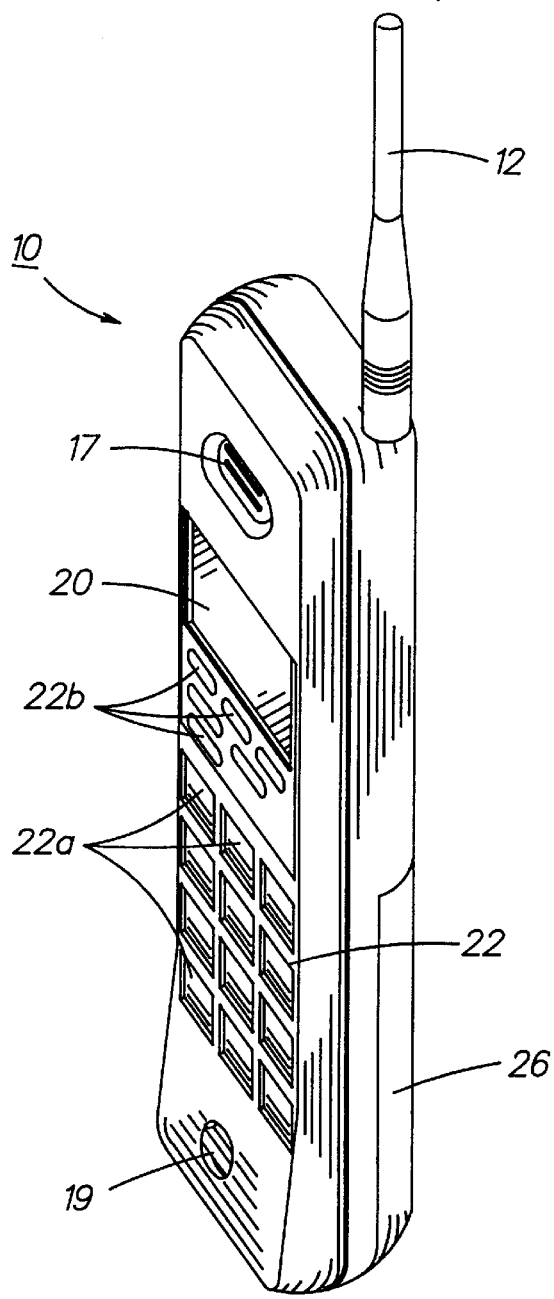
FIG. 2 is an elevational view of the mobile station shown in FIG. 1, and which further illustrates a cellular communication system to which the mobile station is bidirectionally coupled through wireless RF links.
Figure 2:
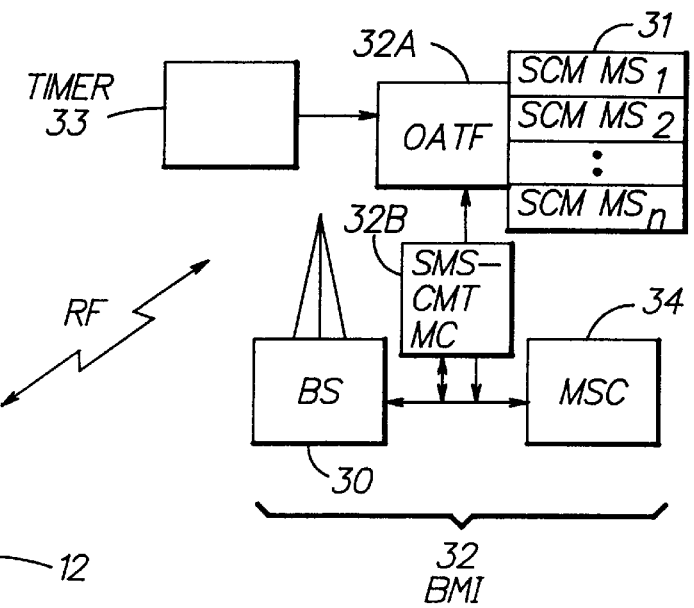

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a radio link with a base site or base station 30. The base station 30 is a part of a cellular network comprising a Base Station/Mobile Switching Center/Interworking function (BMI) 32 that includes a mobile switching center (MSC) 34. The MSC 34 provides a connection to landline trunks when the mobile station 10 is involved in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#, *) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 also stores, in a non-volatile portion thereof, the Short Code Memory (SCM) 24A. The SCM 24A stores, as was indicated above, at least a list comprised of user entered alphanumeric text and related telephone numbers.

The SCM 24A may be an integral part of the mobile station 10, or it may be located on a plug-in module that is inserted into the mobile station 10 during use as in, by example, a GSM mobile station.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM and IS-95 (CDMA). Narrow-band AMPS (NAMPS), as well as TACS, mobile stations may also benefit from the teaching of this invention, as should dual or higher mode phones (e.g., digital/analog (IS-41) or TDMA/CDMA/analog phones). It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the method described below in relation to FIGS. 3A and 3B.

In FIG. 2 it can be seen that a memory 31 is shown to form a portion of the BMI 32. The memory 31 stores a database of SCM data for a plurality of the mobile stations (1–n) that are serviced by the BMI 32. The memory 31 can be associated with the above-referenced Customer Service Center (CSC)/Over-the-Air Activation Function (OTAF) 32A. In other embodiments of this invention the memory 31 can be associated with a Short Message Service (SMS) Cellular Messaging Teleservice (CMT) Message Center (MC) 32B. The SMS CMT is another Point-to-Point Teleservice, and is described in Section 7.1 of IS-136.1.

Reference is now made to FIGS. 3A and 3B for illustrating a presently preferred message flow for a SCM backup procedure and a presently preferred message flow for a SCM download procedure, respectively.

In FIG. 3A the mobile station 10 first sends an SCM Request message to the BMI 32 with a message field set for indicating a Backup operation. The SCM backup operation can be initiated by the user, and/or by an expiration of a timer 28 (FIG. 1) maintained by the mobile station 10. The timeout period for the timer 28 may be fixed, or may be user-programmable (e.g., once per day, once per week, once per month). The SCM backup operation can also be initiated by an expiration of a timer associated with the BMI 32, in particular a timer 33 associated with the OATF 32A or the SMS-CMT MC 32B. In this latter case a message (not illustrated) is first sent from the BMI 32 to the mobile station 10 to initiate the SCM backup operation. It is also within the scope of this invention for the BMI 32 to transmit a SCM backup interval to the mobile station 10. The backup interval is stored in the memory 24, perhaps in a non-volatile portion, and the mobile station 10 then operates the timer 28 at the BMI-specified backup interval for initiating SCM backup operations at the BMI-specified intervals.

In response to the receipt of the SCM Request (backup) message, the BMI 32 sends a SCM Backup REQ message to the mobile station 10. This message indicates either that the mobile station 10 is or is not authorized to perform the SCM backup operation at this time. Assuming that the mobile station 10 is authorized to proceed, the mobile station 10 sends a SCM Backup Data Message to the BMI 32. The SCM Backup Data Message includes all or some of the data stored in the SCM 24A. By example, the mobile station 10 may send only that SCM data that is flagged as having been changed since a last SCM backup operation was performed. This is readily accomplished by providing a flag for each SCM data item. In this case the flag is initialized to zero when the data item is backed up, and is initialized to a one when a data item is first created (e.g., the user enters a new telephone number and associated alpha string). The flag is set to a one whenever the user modifies the data item (e.g., the user changes the telephone number, or changes the alphanumeric text associated with same).

In any case, the SCM data is sent with a specified format as described below. At the completion of the SCM Backup Data operation, the BMI 32 sends a SCM Backup Response message to the mobile station 10. One field of this message includes a SCM Backup Result Code for indicating the success or failure of the SCM backup operation. For example, RF propagation conditions may have prevented a successful receipt of all of the SCM data. If a failure condition is indicated, the mobile station 10 may re-initiate the SCM backup operation, or may try again at a later time.

The received SCM backup data is stored by the BMI 32 in the memory 31 at locations associated with the mobile station 10.

It was mentioned above that the mobile station 10 may filter the SCM data and only transmit that data that is flagged as having been changed since a last SCM backup. In an alternate embodiment the mobile station 10 may transmit all SCM data, and the BMI stores only that data in the memory 31 that differs from the data already stored for that mobile station.

In a preferred embodiment of this invention the SCM data is sent in an encrypted format to prevent its intentional or inadvertent interception by a third party.

At the completion of the SCM backup operation shown in FIG. 3A, the contents of the SCM 24A have been archived by the BMI 32 in the memory 31, which is the desired result.

In FIG. 3B the mobile station 10 initiates the SCM download operation by sending the SCM Request message to the BMI 32 with a Restore indicator being set (instead of the Backup indicator). In response, the BMI 32 sends a Download Request message to the mobile station 10. The Download Request message is currently specified in IS-136.1 in Section 7.2.7.5 for performing an OATS NAM Download operation or a Non-Public Download operation. In accordance with this invention the Download Request Message is modified so as to include a capability to also download the SCM data that was previously stored in the memory 31 by the mobile station 10. In accordance with an aspect of this invention, the SCM data portion of the Download Request Message is transmitted (preferably encrypted) in a predetermined format that corresponds to the format used by the mobile station 10 in the SCM Backup Data Message of FIG. 3A. While receiving the SCM data portion of the Download Request Message, the mobile station 10 performs any desired formatting and stores the SCM data in the SCM 24A. At the termination of the SCM data download, the mobile station 10 sends a Download Response Message to the BMI 32. A suitable format for the Download Response Message is specified in IS-136.1, Section 7.2.7.6. This message includes a Download Result Map as specified in Section 7.2.8.1.4. For the purposes of this invention the Download Result Map is modified so as to indicate whether the SCM data download procedure was unsuccessful or successful. At the end of this procedure, the SCM 24A has been completely or partially reprogrammed with the SCM data stored in the memory 31, which is also a desired result.

It can be appreciated that the SCM restore operation of FIG. 3B can be performed to set the contents of the SCM 24A of a different mobile station than the one that originally performed the SCM backup operation of FIG. 3A. For example, if the user were to purchase a new mobile station, a part of the OAT procedure may also be the setting of the new mobile station's SCM based on the previously archived SCM data.

In order to facilitate the operation of the foregoing SCM-related messaging, the OATS Message Type specified in Section 7.2.8.2.0 of IS-136.1 is modified so as to also specify, in addition to the currently specified Public Encryption Values, NAM Commit Request, NAM Commit Response, and other messages, also the above described SCM Request, SCM Backup Data, SCM Backup Response, and SCM Backup Request messages.

The SCM Backup Data and Download Request Messages of FIGS. 3A and 3B, respectively, each include a SCM data field that comprises an SCM index which gives a number of a first SCM Data Block sub-field of the message. The entire SCM 24A can be transmitted by sending multiple instances of the SCM data fields in one or more SCM Backup Data and Download Request Messages, if required. The SCM Index Field is followed by one or more instances of the SCM Data Block sub-field. One SCM Data Block sub-field provides the mobile station 10 and the BMI 32 with one SCM Data Block. In a presently preferred, but not limiting, embodiment of this invention, a maximum length of the SCM Data Block sub-field is 394 bits. Also in a presently preferred embodiment of this invention, the SCM Data Block sub-field is comprised of an Address Length portion (e.g., 5 bits) and an Address portion which is encoded using TBCD as specified in IS-136.2, Section 6.5, "Address Info". The SCM Data Block sub-field further includes an Alpha Identifier Length portion (e.g., 5 bits), and an associated Alpha Identifier portion that is preferably encoded using the International Reference Alphabet (ITU Rec T.50 (1992)), or IRA, as specified also in IS-136.2, Section 6.5. Other encoding schemes could be used if desired.

In accordance with an aspect of this invention, the use of the SCM Data Block sub-field enables the SCM data elements (e.g., telephone numbers and their order of storage, alpha-strings, if any, associated with these numbers, etc.) to be separately identified during transmission. This further enables, when restoring (downloading) the SCM data to the same or a different mobile station 10, for the SCM data to be selectively stored, not stored, and/or truncated (based on the Alpha Identifier Length portion) as required by the receiving mobile station. This therefore provides a general representation of the contents of the SCM 24A as a universal SCM data format for storing and transferring SCM data, the format not being related or associated with any one particular cellular telephone architecture, manufacturer, and/or SCM 24A limitations. This aspect of the invention thus avoids the problems and non-transportability that would result if only a binary image of the SCM 24A were transmitted to or from the mobile station 10.

In a preferred embodiment of this invention the Address Field specifies a phone number as it is specified in the US/International Numbering system.

As an example, a given SCM entry includes:
Alpha='Seppo', Number=123-4567.

A corresponding SCM data block would appear as follows:
Address Length=7=00111B (count of 4-bit TBCD numbers)
Address 1234567=0001 0010 0011 0100 0101 0110 0111 (binary)
Alpha Identifier Length=5=00101B (count of IRA codes)
Alpha Identifier='Seppo'=01010011 01000101 01010000 0101000 0100111 (binary)

Although described in the context of preferred embodiments, it should be realized that a number of modifications to these teachings may occur to one skilled in the art. By example, and as was discussed previously, the teachings of this invention are not limited for use with the OATF 32A, but can be implemented as well using the SMS-CMT MC 32B. In this case the messaging and SCM data transfers are implemented by suitably composed SMS messages that are transmitted between the mobile station 10 and the BMI 32. Packet data transfer protocols can also be used to transfer the messaging and SCM data.

The teachings of this invention are also not limited for use only with the IS-136 embodiment described above. By example, the teachings of this invention can also be practiced in the Global System for Mobile Communications (GSM) environment. In this regard reference can be had to the following exemplary documents: GSM 02.90 "Unstructured Supplementary Service Data (USSD)", GSM 02.30 "Man-Machine Interface (MMI) of the Mobile Station (MS)", GSM 02.04 "General on Supplementary Services", GSM 03.40 "Technical Realization of the Short Message Service (SMS) Point-to-Point (PP)", and GSM 03.38 "Alphabets and Language-Specific Information". These messaging and data transfer capabilities of the GSM system can be modified, based on the foregoing teachings, to provide for the archiving and restoration of SCM data.

The transmission privacy of the SCM data can be insured using techniques that are the same or similar to those currently specified for OATS, e.g., message encryption using the CMEA algorithm.

Any suitable data compression/decompression algorithms can also be employed to make the information transfer between the mobile station 10 and the BMI 32 as rapid as possible.

The teachings of this invention can also be employed with, by example, CDMA telecommunications systems, and hybrid TDMA/CDMA telecommunications systems.

Also, whereas the SCM 24A has been described in the context of a device that stores phone numbers and optional alphanumeric text, it is also within the scope of this invention to store other information in the SCM 24A, and/or to employ the Backup/Restore operations of this invention with data stored in other regions of the memory 24. By example only, other data that may be desirable to archive in the network includes various user-specified mobile station operational parameters, such as alerting type, alerting volume, preferred language, etc., as well as information maintained by the mobile station, such as call timers, missed calls, etc.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a telecommunications system, comprising the steps of:
    providing at least one mobile station and a telecommunications network that are bidirectionally coupled together through a radio link, the mobile station including a first memory for storing at least user-specified information using a predetermined data storage format;
    transmitting at least some of the contents of the first memory from the mobile station to the telecommunications network;
    receiving the transmitted contents of the first memory and storing at least some of the received contents in a second memory in the telecommunications network;
    transmitting contents of the second memory from the telecommunications network to the mobile station; and
    receiving the transmitted contents of the second memory and storing at least some of the received contents in the first memory, thereby restoring information that was transmitted from the first memory to the telecommunications network, wherein
    the steps of transmitting transmit memory content data using a predetermined data format that is independent of the predetermined data storage format of the first memory.

2. A method as in claim 1, wherein the first memory is comprised of a Short Code Memory (SCM), and wherein the second memory is associated with an Over-the-Air Activation Function (OATF).

3. A method as in claim 1, wherein the first memory is comprised of a Short Code Memory (SCM), and wherein the second memory is associated with a Short Message Service (SMS) Cellular Messaging Teleservice (CMT) Message Center (MC).

4. A method as in claim 1, wherein the step of transmitting at least some of the contents of the first memory occurs in response to an input from a use of the mobile station.

5. A method as in claim 1, wherein the step of transmitting at least some of the contents of the first memory occurs in response to an expiration of a timer that is maintained by the mobile station.

6. A method as in claim 1, wherein the step of transmitting at least some of the contents of the first memory occurs in response to an expiration of a timer that is maintained by the telecommunications network.

7. A method as in claim 1, wherein the step of transmitting at least some of the contents of the first memory transmits only those contents of the first memory that have changed or that have been newly added since a last execution of the step of transmitting at least some of the contents of the first memory.

8. A method as in claim 1, wherein the step of receiving the transmitted contents of the second memory receives an alphanumeric string having a length of n characters, and wherein the step of storing at least some of the received contents in the first memory includes an initial step of truncating the n characters before storage in the first memory.

9. A method as in claim 1, wherein the step of transmitting at least some of the contents of the first memory is executed by a first mobile station, and wherein the step of receiving the transmitted contents of the second memory is executed by a second mobile station.

10. A method for operating a telecommunications system, comprising the steps of:
    providing at least one mobile station and a Base Station/Mobile Switching Center/Interworking function (BMI)

that are bidirectionally coupled together through a digital radio link, the mobile station including a Short Code Memory (SCM) storing data for representing at least user-specified information;

transmitting a SCM Request Message, with a SCM Backup indicator set, from the mobile station to the BMI;

transmitting a SCM Backup authorization message from the BMI to the mobile station;

transmitting at least one SCM Backup Data message from the mobile station to the BMI, the SCM Backup Data message having data fields for conveying all or some of the SCM data to the BMI, the BMI storing the SCM data in a memory; and at a completion of transmission of the SCM data, transmitting a SCM Backup Response message from the BMI to the mobile station for indicating a success or failure of the SCM data transmission, wherein the data fields of the SCM Backup Data message are used for transmitting SCM data in a predetermined universal format that is independent of a particular data storage format of the SCM.

11. A method as in claim 10, and further comprising steps of;

transmitting a SCM Request message, with a SCM Restore indicator set, from the mobile station to the BMI;

transmitting a Download Request message from the BMI to the mobile station, the Download Request message having data fields for conveying the SCM data that is stored in the memory of the BMI, the mobile station executing a step of storing in the SCM at least a portion of the SCM data that is received from the BMI; and at a completion of transmission of the SCM data from the BMI to the mobile station, transmitting a Download Response message from the mobile station to the BMI for indicating a success or failure of the SCM data transmission.

12. A method as in claim 11, wherein the step of transmitting a Download Request message from the BMI transmits an alphanumeric string having a length of n characters, and wherein the step of storing in the SCM includes an initial step of truncating the n characters before storage in the SCM.

13. A method as in claim 11, wherein the step of transmitting the SCM Request Message, with the SCM Backup indicator set, is executed by a first mobile station, and wherein the step of transmitting the SCM Request Message, with the SCM Restore indicator set, is executed by a second mobile station.

14. A method as in claim 11, wherein at least the SCM data is transmitted in at least one of an encrypted form or a compressed form.

15. A method as in claim 10, wherein the BMI memory is associated with an Over-the-Air Activation Function (OATF).

16. A method as in claim 10, wherein the BMI memory is associated with a Short Message Service (SMS) Cellular Messaging Teleservice (CMT) Message Center (MC).

17. A method as in claim 10, wherein the step of transmitting a SCM Request Message occurs in response to an input from a use of the mobile station.

18. A method as in claim 10, wherein the step of transmitting a SCM Request Message occurs in response to an expiration of a timer that is maintained by the mobile station.

19. A method as in claim 10, wherein the step of transmitting a SCM Request Message occurs in response to an expiration of a timer that is maintained by the BMI.

20. A method as in claim 10, wherein the step of transmitting at least one SCM Backup Data message transmits only SCM data that have changed or that have been newly added since a last execution of a SCM Backup operation.

21. A method for operating a telecommunications system, comprising the steps of:

providing a first mobile station and a telecommunications network that are bidirectionally coupled together through a radio link, the first mobile station comprising a first Short Code Memory (SCM) for storing at least user-specified information in accordance with a SCM data storage format;

providing a second mobile station that is bidirectionally coupled to the telecommunications network through a radio link, the second mobile station comprising a second SCM for storing at least user-specified information in accordance with a SCM data storage format that is the same as the SCM data storage format of the first mobile station or that is different than the SCM data storage format of the first mobile station;

transmitting contents of the first SCM from the first mobile station to the telecommunications network using a SCM data transmission format that differs from the SCM data storage format of the first mobile station, the step of transmitting including a preliminary step of reformatting the transmitted contents from the SCM data storage format of the first mobile station to the SCM data transmission format;

receiving the transmitted contents of the first SCM and storing the received contents in a network memory in the telecommunications network;

in response to a triggering event, transmitting contents of the network memory from the telecommunications network to the second mobile station using the SCM data transmission format; and receiving the transmitted contents of the network memory and storing at least some of the received contents in the second SCM of the second mobile station, the step of receiving including a step of reformatting the received contents of the network memory from the SCM data transmission format to the SCM data storage format of the second SCM.

22. A method as in claim 21, wherein the network memory is associated with one of a telecommunications network Short Message Service (SMS) Cellular Messaging Teleservice (CMT) Message Center (MC) or an Over-the-Air Activation Function (OATF).

23. A method as in claim 21, wherein the step of transmitting contents of the first SCM occurs in response to one of an input from a use of the mobile station, an expiration of a timer that is maintained by the mobile station, or an expiration of a timer that is maintained by the telecommunications network.

24. A method as in claim 21, wherein the step of transmitting contents of the first SCM selectively transmits only those contents of the first SCM that have changed or that have been newly added since a last execution of the step of transmitting contents of the first SCM.

25. A method as in claim 21, wherein the step of transmitting contents of the first SCM transmits all contents of the first SCM, and wherein the step of storing selectively stores in the network memory only that portion of the received content that differs from what is already stored in the network memory.

26. A method as in claim 21, wherein the step of storing the received contents in a network memory in the telecommunications network stores the received contents in a database having a plurality of entries, individual ones of the plurality of entries corresponding to an individual one of a plurality of mobile stations, and wherein the received contents are stored in an entry that corresponds to the first mobile station.

\* \* \* \* \*